(12) United States Patent
Fox et al.

(10) Patent No.: US 10,793,261 B2
(45) Date of Patent: Oct. 6, 2020

(54) ELECTRO-MECHANICALLY BIASED SUPERCRITICAL FLIGHT CONTROL SURFACE LOADING TO REDUCE HIGH PRESSURE ACTUATION CYCLES

(71) Applicant: The Boeing Company, Chicago, IL (US)

(72) Inventors: Michael Thomas Fox, Saint Charles, MO (US); Eric Anton Howell, Ballwin, MO (US); Jeffrey M. Roach, St. Charles, MO (US)

(73) Assignee: The Boeing Company, Chicago, IL (US)

( * ) Notice: Subject to any disclaimer, the term of this patent is extended or adjusted under 35 U.S.C. 154(b) by 382 days.

(21) Appl. No.: 15/952,369

(22) Filed: Apr. 13, 2018

(65) Prior Publication Data

US 2019/0315455 A1  Oct. 17, 2019

(51) Int. Cl.
*B64C 13/40* (2006.01)
*B64C 13/50* (2006.01)

(52) U.S. Cl.
CPC .............. *B64C 13/40* (2013.01); *B64C 13/50* (2013.01)

(58) Field of Classification Search
CPC . B64C 13/40; B64C 9/02; B64C 13/50; F16F 7/1022; F15B 2211/7053
See application file for complete search history.

(56) References Cited

U.S. PATENT DOCUMENTS 2,660,028 A   11/1953  Geyer
2,679,827 A   6/1954   Perdue
3,253,613 A   5/1966   Richolt
3,585,902 A   6/1971   Anderson
4,932,311 A   6/1990   Mibu et al.
5,074,495 A   12/1991  Raymond
(Continued)

FOREIGN PATENT DOCUMENTS

DE   102007029358 A1   1/2009
EP       1500825 A2    1/2005
(Continued)

OTHER PUBLICATIONS

European Search Report dated Sep. 6, 2019 in re EP application No. 19169010.6 filed Apr. 12, 2019.
(Continued)

*Primary Examiner* — Valentina Xavier
(74) *Attorney, Agent, or Firm* — Coats + Bennett, PLLC (57) ABSTRACT

An actuator assembly for an aircraft includes a support strut operatively coupled to a hinge axis of a flight control member of the aircraft, a hydraulic actuator operatively coupled to the flight control member via a pivot element, and an electro-mechanical actuator (EMA) having first and second opposing ends and a biasing member. The first end is operatively coupled to a support structure of the aircraft, and the second end is operatively coupled to both the support strut and the hydraulic actuator. The biasing member moves between a compressed state and an expanded state in response to a varying biasing load exerted on a surface of the flight control member, thereby reducing an amount of current needed to drive the EMA, as well as a number of high-pressure hydraulic cycles of the hydraulic actuator to control the flight control member.

20 Claims, 10 Drawing Sheets

(56) References Cited

U.S. PATENT DOCUMENTS

| | | |
|---|---|---|
| 5,144,851 A | 9/1992 | Grimm et al. |
| 5,937,646 A | 8/1999 | Zakula |
| 6,352,018 B1 | 3/2002 | Krisher |
| 6,578,425 B2 | 6/2003 | Hickman |
| 7,059,563 B2 | 6/2006 | Huynh |
| 8,109,163 B2 | 2/2012 | Hudson et al. |
| 8,359,851 B2 | 1/2013 | Haase |
| 8,418,956 B2 | 4/2013 | Fukui |
| 8,499,552 B2 | 8/2013 | Kauss et al. |
| 9,334,914 B2 | 5/2016 | Gartner |
| 9,618,102 B2 | 4/2017 | Hirai |
| 9,709,052 B1 | 7/2017 | Tanju et al. |
| 9,823,670 B2 | 11/2017 | Wilson et al. |
| 9,969,233 B2 | 5/2018 | Leglize |
| 9,994,304 B2 | 6/2018 | Ito |
| 10,384,764 B2 | 8/2019 | Blanc et al. |
| 2007/0194738 A1* | 8/2007 | Hirai .................. B64C 13/341 318/480 |
| 2015/0059325 A1 | 3/2015 | Knussman et al. |
| 2015/0114151 A1* | 4/2015 | Hirai .................. F15B 9/12 74/89.25 |
| 2016/0091004 A1 | 3/2016 | Gomm et al. |
| 2016/0096617 A1* | 4/2016 | Ito .................. B64C 13/505 92/51 |
| 2017/0233064 A1 | 8/2017 | McCormick et al. |
| 2017/0335916 A1 | 11/2017 | Fox |
| 2018/0128359 A1 | 5/2018 | Fida |
| 2018/0135717 A1 | 5/2018 | Fox et al. |
| 2018/0156293 A1 | 6/2018 | Fox et al. |

FOREIGN PATENT DOCUMENTS

| | | |
|---|---|---|
| EP | 1710446 A2 | 10/2006 |
| EP | 3067252 A1 | 9/2016 |

OTHER PUBLICATIONS

European Search Report dated Sep. 3, 2019 in re EP application No. 19167685.7 filed Apr. 5, 2019.
Freescale Semiconductor, Inc., "M68HC08 Microcontrollers, High Data Rate Wireless USB Optical Mouse Solution Using the MC68HC908QY4 and MC68HC908JB12," Designer Reference Manual, DRM055/D, Jan. 1, 2004, Motorola, pp. 1-44.
Avago Technologies, "Optical Mouse Sensors," AV00-0115EN, May 14, 2007, pp. 1-24.

* cited by examiner

ELECTRO-MECHANICALLY BIASED SUPERCRITICAL FLIGHT CONTROL SURFACE LOADING TO REDUCE HIGH PRESSURE ACTUATION CYCLES

TECHNICAL FIELD

The present disclosure relates generally to aircraft flight control systems, and more particularly to systems for controlling the flight control members of an aircraft.

BACKGROUND

Aircraft include one or more movable flight control members to permit pilots and/or on-board systems to adjust and control the attitude of the aircraft during flight. Some typical flight control members found on aircraft include, but are not limited to, ailerons on the wings for roll control, elevators on the horizontal tail of the empennage for pitch control, a rudder on the vertical tail of the empennage for yaw control, and various other movable control surfaces.

Movement of a flight control member is typically effected by one or more actuators mechanically coupled between a base on the aircraft (e.g., a wing spar) and the flight control member. In many aircraft, the actuators for flight control members are linear hydraulic actuators driven by a hydraulic system. In such systems, the aircraft's hydraulic system provides hydraulic fluid to the actuators via ports on the actuators to move and position the flight control members as necessary during flight.

Generally, existing hydraulic systems open the valves on an actuator to provide the actuator with hydraulic fluid when the loads exerted on a surface of the flight control members are high. Therefore, the hydraulic pressures within the actuator chamber are also high. However, this "high, pressure-gain operation" presents a distinct design complication. Particularly, designers are generally forced to incorporate new or additional features in the valves to handle high-pressure gain operations at the actuator when the aircraft travels at high speed.

BRIEF SUMMARY

Aspects of the present disclosure relate to controlling the movement of a flight control member on an aircraft using an actuator assembly. The actuator assembly comprises an electro-mechanical actuator (EMA) having a biasing member that moves between a compressed state and an expanded state in response to a varying biasing load exerted on a surface of the flight control member. This reduces an amount of current needed to drive the EMA, as well as a number of high-pressure hydraulic cycles of the hydraulic actuator to control the flight control member.

One aspect of the present disclosure provides an actuator assembly configured to control movement of a flight control member on an aircraft. The actuator assembly of this aspect comprises a support strut, a hydraulic actuator, and an EMA. The support strut operatively couples to a hinge axis of the flight control member of an aircraft. The hydraulic actuator is coupled to the flight control member via a pivot element, and pivots the flight control member about the hinge axis. The EMA comprises a first end operatively coupled to a support structure of the aircraft, a second end, opposite the first end, operatively coupled to both the support strut and the hydraulic actuator, and a biasing member configured to move between a compressed state and an expanded state responsive to a varying biasing load exerted on a surface of the flight control member.

In one aspect, the biasing member is configured to move to the compressed state responsive to an increase in the biasing load exerted on the flight surface of the flight control member, and move to the expanded state responsive to a decrease in the biasing load exerted on the flight surface of the flight control member.

In one aspect, the support strut comprises a rigid, fixed length support member configured to translate motion of the flight control member to the biasing member responsive to the increase in the biasing load exerted on the flight surface, and translate bias of the biasing member to the flight control member responsive to the decrease in the biasing load exerted on the flight surface.

In one aspect, the EMA comprises first and second spaced-apart mount members. The biasing member is disposed between the first and second mount members, and biases the first and second mount members away from each other.

In such aspects, the first mount member moves relative to the second mount member responsive to a biasing force exerted on the first mount member by the biasing member, and a compression force exerted on the first mount member by the support strut.

In one aspect, the hydraulic actuator comprises one or more ports configured to receive hydraulic fluid from a variable hydraulic system on the aircraft. When in the compressed state, the biasing member is configured to reduce a number of high-pressure hydraulic cycles of the hydraulic actuator.

In one aspect, the biasing member is configured to reduce a current on an EMA motor that drives the EMA to move between a retracted state and an extended state.

In one aspect, the support strut, the hydraulic actuator, and the second end of the EMA pivot about a common axis when the biasing member moves between the compressed state and the expanded state.

According to one aspect of the present disclosure, an aircraft comprises a support structure, a flight control member, and an actuator assembly disposed between the support structure and the flight control member. In this aspect, the actuator assembly comprises a support strut operatively coupled to a hinge axis of the flight control member, a hydraulic actuator coupled to the flight control member via a pivot element, and configured to pivot the flight control member about the hinge axis, and an electro-mechanical actuator (EMA). The EMA comprises a first end operatively coupled to the support structure, a second end, opposite the first end, operatively coupled to both the support strut and the hydraulic actuator, and a biasing member configured to move between a compressed state and an expanded state responsive to a varying biasing load exerted on a surface of the flight control member.

In one aspect, the aircraft further comprises a distributed variable-pressure hydraulic system configured to selectively provide hydraulic fluid to the hydraulic actuator. In these aspects, the biasing member moves to the compressed state during a cycle in which the variable-pressure hydraulic system is not providing the hydraulic fluid to the hydraulic actuator.

In one aspect, the aircraft further comprises a control circuit configured to reduce a current to a motor that drives the EMA to move between a retracted state and an extended state.

In one aspect, the biasing member is configured to move to the compressed state when the biasing load exerted on the surface of the flight control member increases, and move to the expanded state when the biasing load exerted on the surface of the flight control member decreases.

In one aspect, the support strut comprises a rigid, fixed length support member configured to translate motion of the flight control member to the biasing member responsive to the increase in the biasing load exerted on the flight surface, and translate a biasing force of the biasing member to the flight control member responsive to the decrease in the biasing load exerted on the flight surface.

In one aspect, the EMA further comprises first and second spaced-apart mount members. The biasing member is disposed between the first and second mount members and is configured to bias the first and second mount members away from each other.

One aspect of the disclosure provides a method of controlling a flight control member of an aircraft comprising a rigid support strut operatively coupled to a hinge axis of a flight control member, a hydraulic actuator operatively coupled to the flight control member via a pivot element, and an electro-mechanical actuator (EMA) comprising a biasing member and first and second opposing ends, wherein the first and second ends are operatively coupled, respectively, to a support structure of the aircraft, and to both the support strut and the hydraulic actuator. In these aspects, the method comprises compressing the biasing member responsive to an increase in a biasing load exerted on a flight surface of the flight control member, and expanding the biasing member responsive to a decrease in the biasing load exerted on the flight surface of the flight control member.

In one aspect, compressing the biasing member comprises translating motion of the flight control member via the support strut to the biasing member responsive to the increase in the biasing load exerted on the flight surface.

In one aspect, expanding the biasing member comprises translating a biasing force of the biasing member via the support strut to the flight control member responsive to the decrease in the biasing load exerted on the flight surface.

In one aspect, the method further comprises reducing a current needed by a motor that drives the EMA between a retracted state and an expanded state responsive to at least one of the biasing member compressing and expanding.

In one aspect, the method further comprises selectively providing hydraulic fluid to the hydraulic actuator using a distributed variable-pressure hydraulic system on the aircraft. In these aspects, compressing the biasing member comprises compressing the biasing member when the hydraulic system is not providing the hydraulic fluid.

In one aspect, the method further comprises reducing a number of high-pressure hydraulic cycles of the hydraulic actuator responsive to the biasing member moving to the compressed state.

BRIEF DESCRIPTION OF THE DRAWINGS

Aspects of the present disclosure are illustrated by way of example and are not limited by the accompanying figures with like references indicating like elements.

DETAILED DESCRIPTION

Aspects of the present disclosure relate to an actuator assembly for controlling movement of a flight control member of an aircraft. More particularly, the actuator assembly includes a support strut and a hydraulic actuator operatively coupled to a flight control member of the aircraft, and an electro-mechanical actuator (EMA) having a biasing member.

The EMA is operatively coupled at one end to a support structure of the aircraft, and at a second end to both the support strut and the hydraulic actuator. During flight, the biasing member moves between a compressed state and an expanded state. The biasing member moves between states in response to a varying biasing load exerted on a flight control surface of the flight control member, thereby reducing an amount of current needed to drive the EMA, and reducing a number of high-pressure hydraulic cycles of the hydraulic actuator to control the flight control member.

The actuator assembly of the present disclosure provides benefits that conventional actuator systems are not capable of providing. For example, by reducing the number of high pressure cycles of the hydraulic actuator, a distributed hydraulic system providing the flow of hydraulic fluid is able to avoid operating at high pressure at least part of the time. Desirably, this means that a low pressure pump driven by the aircraft engines provides a larger percentage of hydraulic fluid flow. In turn, this permits the distributed hydraulic system to achieve variable pressure with fewer high pressure cycles.

Figure 1:
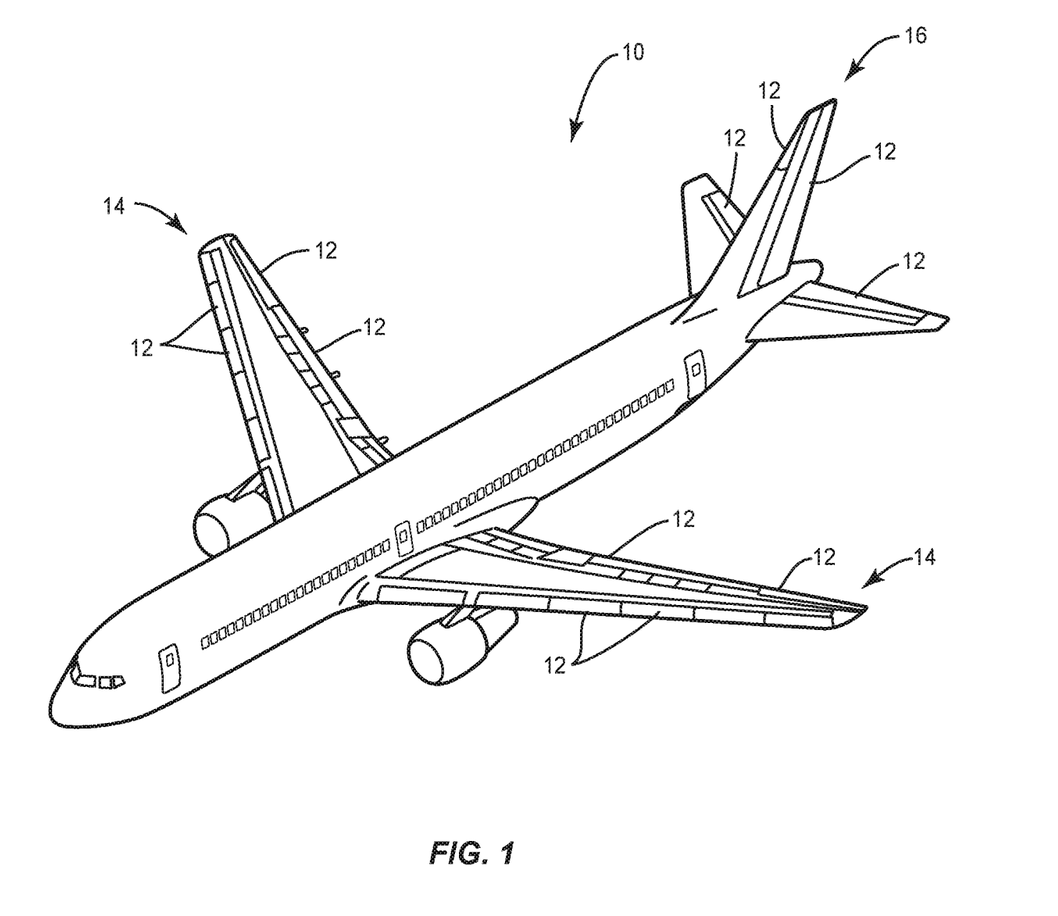
FIG. 1 is a perspective view of an aircraft configured according to one aspect of the present disclosure.

Turning now to the drawings, FIG. 1 illustrates an aircraft 10 configured according to one aspect of the present disclosure. As seen in FIG. 1, aircraft 10 comprises a plurality of different types of flight control members 12 distributes on aircraft 10. By way of non-limiting example, the flight control members 12 can be disposed on the wings 14 or the tail section 16, and can include but are not limited to a rudder, elevators, ailerons, wing leading and trailing edge devices, and spoilers. According to aspects of the present disclosure, the flight control members 12 are movably attached to aircraft 10. During flight, pilots and/or control systems on board the aircraft change the orientation of the flight control members to adjust and control the attitude of the aircraft.

Figure 2:
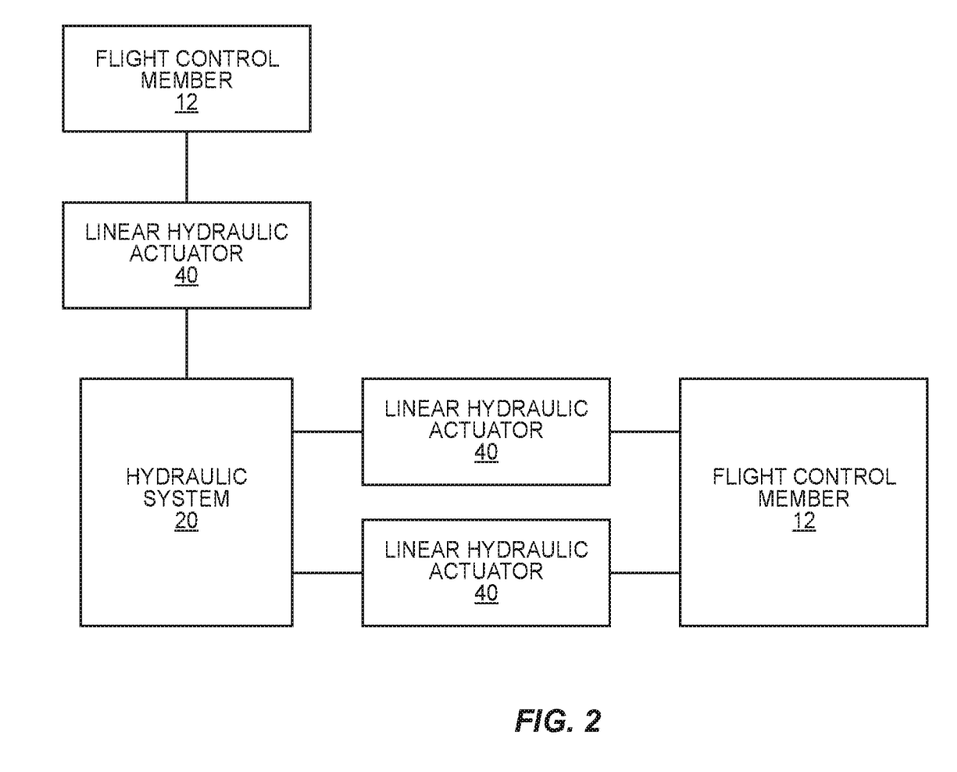
FIG. 2 is a schematic view of a hydraulic system and actuators that move flight control members according to one aspect of the present disclosure.

FIG. 2 illustrates a distributed hydraulic system 20 configured to provide hydraulic fluid to the actuator assembly 30 at high pressure according to one aspect of the present disclosure. As seen in FIG. 2, hydraulic system 20 is operatively connected to a plurality of linear hydraulic actuators 40. Each linear hydraulic actuator 40 is operatively connected to a flight control member 12, and is controlled by the hydraulic system 20 to move one or more of those flight control members 12. In particular, the hydraulic system 20 supplies hydraulic fluid to each of the linear hydraulic actuators 40, which in turn, adjusts the orientation of the flight control members 12.

Figure 3:
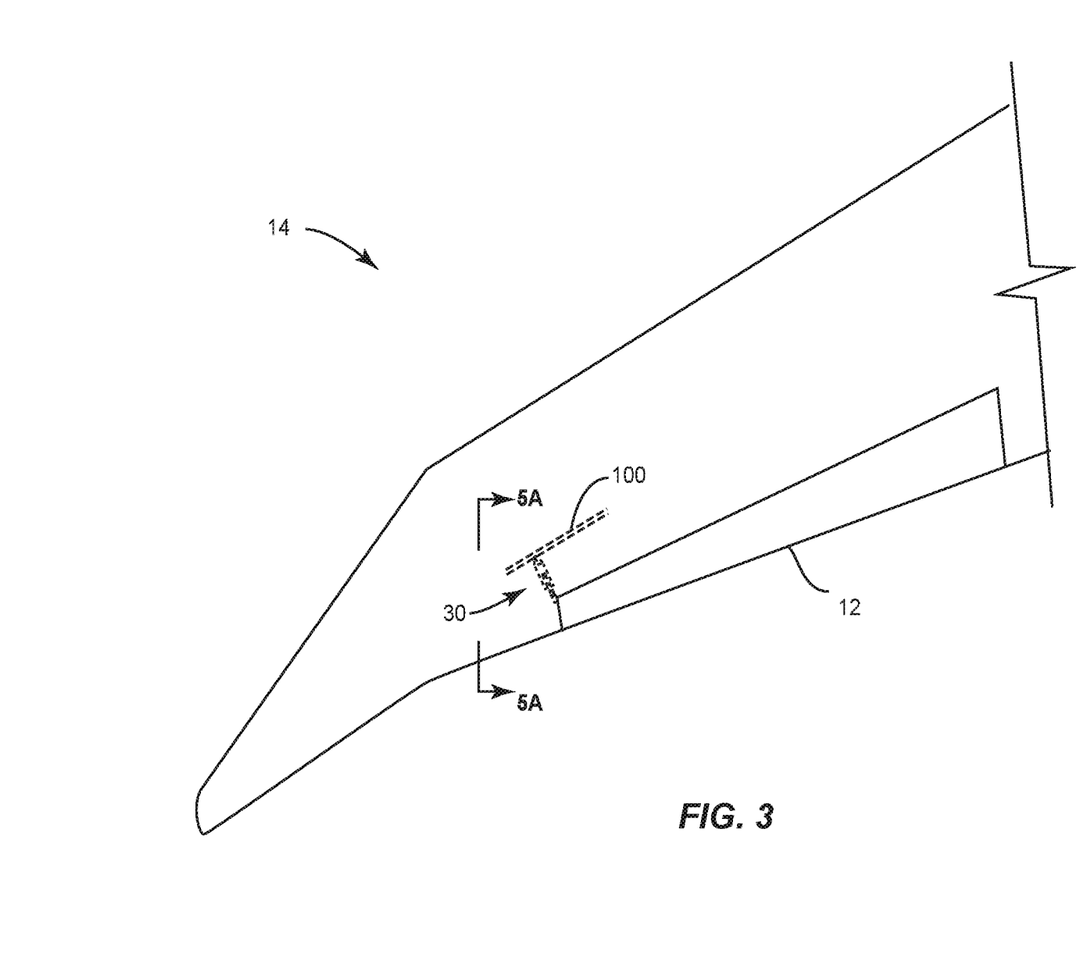
FIG. 3 is a perspective view of an aircraft wing configured with an electro-mechanical actuator (EMA) according to one aspect of the present disclosure.

FIG. 3 is a top view of a wing 14 illustrating one possible placement for an actuator assembly 30 on aircraft 10 according to one aspect of the present disclosure. As will be readily appreciated by those of ordinary skill in the art, the particular positioning of actuator assembly 30 on wing 14 is for illustrative purposes only. Indeed, in other aspects, actuator assembly 30 may be disposed on parts of aircraft 10 other than wing 14, such as on the tail section 16, for example, as well as in other positions and orientations. Regardless of the particular placement and orientation, however, actuator assembly 30 is disposed between a support structure 100 and the flight control member 12 such that actuator assembly 30 is able to control movement of the flight control member 12 as previously described.

Figure 4A:
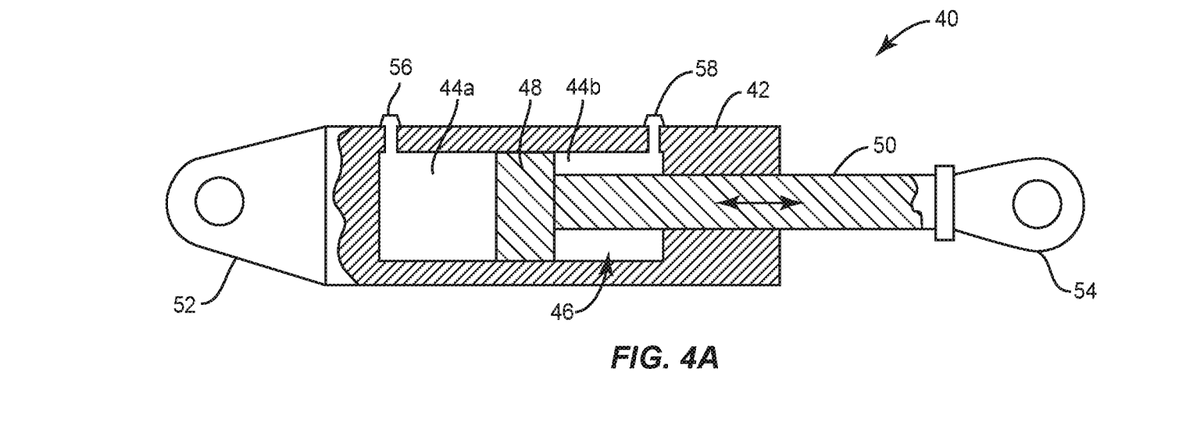
FIG. 4A is a schematic view of a linear hydraulic actuator configured according to one aspect of the present disclosure.
Figure 4B:
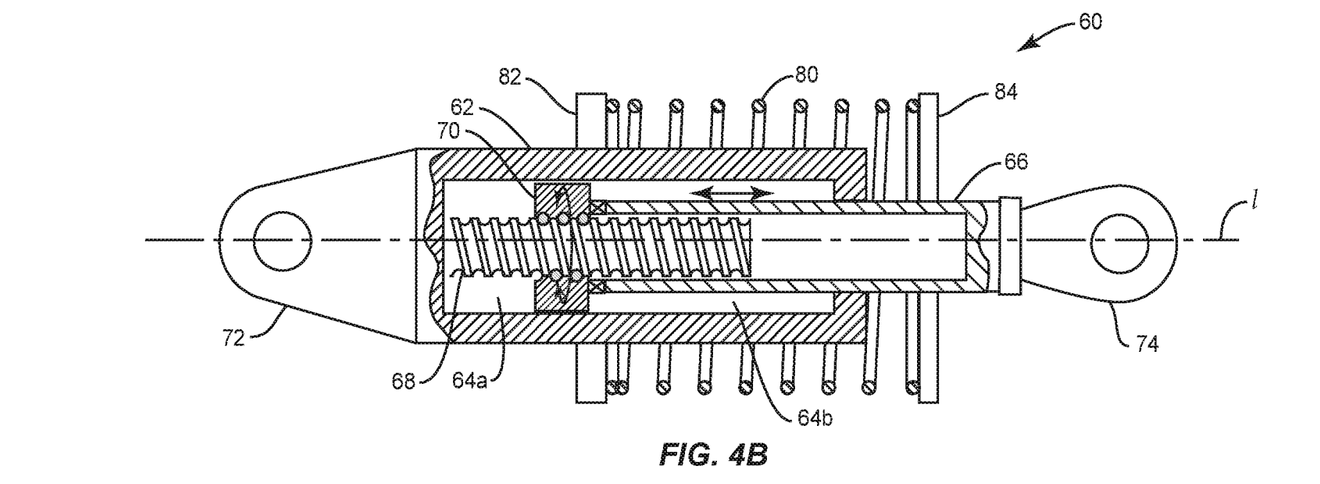
FIG. 4B is a schematic view of an electro-mechanical actuator (EMA) configured according to one aspect of the present disclosure.

FIGS. 4A-4B are partial cutaway views of some of the components of an actuator assembly 30 according to one aspect of the disclosure. In this aspect, the actuator assembly 30 comprises a linear hydraulic actuator 40 (FIG. 4A) and an electro-mechanical actuator (EMA) 60 (FIG. 4B). The linear hydraulic actuator 40 comprises a body 42 that forms first and second interior chambers 44a, 44b (collectively, interior chamber 44), a piston member 46 comprising a piston head 48 connected to one end of a shaft 50, a first terminal 52, a second terminal 54, and a pair of ports 56, 58 that extend through the body 42 of the linear hydraulic actuator 40 and open into the first and second interior chambers 44a, 44b, respectively.

The first and second terminals 52, 54 are movable relative to each other during actuation of the linear hydraulic actuator 40. More particularly, the first terminal 52 is connected to a support structure 100 on aircraft 10 (e.g., a wing spar), while the second terminal 54 is operatively connected to a flight control member 12. During actuation, the hydraulic system 20 supplies hydraulic fluid at high pressure to the interior chamber 44a via port 56. The hydraulic fluid entering interior chamber 44a moves piston 46 in a first direction within interior chamber 44 and forces the hydraulic fluid in interior chamber 44b out through port 58. As seen below in more detail, this linear motion of the piston 46 in the first direction increases the distance between the first and second terminals 52, 54, and is translated to rotational motion that causes the flight control member 12 to rotate about its hinge axis.

The hydraulic system 20 also supplies hydraulic fluid at high pressure to interior chamber 44b via port 58. The hydraulic fluid entering interior chamber 44b moves piston 46 in a second direction within chamber 44, opposite the first direction, and forces the hydraulic fluid in interior chamber 44a out through port 56. The linear motion of the piston 46 in the second direction decreases the distance between the first and second terminals 52, 54, and is translated to rotational motion that causes the flight control member 12 to rotate about its hinge axis in the opposite direction.

FIG. 4B is a partial cutaway view illustrating an electro-mechanical actuator (EMA) 60 according to one aspect of the present disclosure. As seen in FIG. 4B, EMA 60 comprises a body 62 forming first and second interior chambers 64a, 64b (collectively, interior chamber 64), a rod 66, a threaded shaft 68, and a motor-driven flywheel 70. A first terminal 72 is attached to EMA 60 at one end, and a second terminal 74 is attached to rod 66 at the opposite end of EMA 60.

The first terminal 72 connects to the support structure 100 of aircraft 10. However, as seen later in more detail, the second terminal 74 connects to the hinge axis of the flight control member 12 via a rigid support strut. In operation, a motor (not shown) powers the flywheel 70 to rotate about threaded shaft 68. Rotation in a first direction moves the rod 66 linearly along a longitudinal axis/of EMA 60 in a first direction such that a distance between the first and second terminals 72, 74 increases. Rotation in a second direction moves the rod 66 linearly along the longitudinal axis/in a second direction, opposite the first direction, such that the distance between the first and second terminals 72, 74 decreases.

As seen in FIG. 4B, this aspect of EMA 60 also comprises a biasing member 80 disposed between first and second mount members 82, 84 that are spaced apart from each other. The first mount member 82 is fixedly attached to the exterior of the body 62, while the second mount member 84 is fixedly attached to the exterior of rod 66. The second mount member 84 moves linearly with rod 66 responsive to the rotational motion of the flywheel 70 about threaded shaft 68, and relative to the first mount member 82. The biasing member 80, which in this aspect comprises a spring, normally biases the first and second mount members 82, 84 away from each other.

As described in more detail below, the biasing member 80 provides benefits that conventional electro-mechanical actuators are not configured to provide. Particularly, biasing member 80 configures EMA 60 to react to the supercritical wing biased hinge moment at any surface position while the linear hydraulic actuator 40 is at rest (i.e., when hydraulic system 20 is not providing hydraulic fluid to the linear hydraulic actuator 40 at high pressure). That is, rod 66 in EMA 60 retracts while the linear hydraulic actuator 40 retracts, thereby maintaining the flight control member at a fixed angular position relative to wing 14. As rod 66 retracts, the biasing member 80 compresses, thereby beneficially reducing the amount of work needed by the motor to power the flywheel 70 and significantly decreasing the heat generated by the EMA 60. This reduction can be sensed, for example, by measuring the winding current of the motor that powers the flywheel 70.

The biasing member 80 continues to compress as the bias load on the flight control member 12 increases. In one aspect, the bias load on the flight control member 12 increases with speed of the aircraft 10. Thus, at high aircraft speeds, EMA 60 can be used to dither the flight control member 12 about a nearly balanced load exerted on multiple surfaces of flight control member 12 to relieve the high, pressure-gain operation region of the linear hydraulic actuator 40. In turn, this beneficially reduces the number of times that hydraulic system 20 provides hydraulic fluid to the linear hydraulic actuator 40, particularly at high pressure, and improves reliability. Further, if the EMA 60 of the present disclosure were to fail locked, no significant limitation on the range of motion of flight control member 12 would occur.

FIGS. 5A-5D illustrate an actuator assembly 30 in more detail. As seen in these figures, the actuator assembly 30 comprises the linear hydraulic actuator 40, the EMA 60, a support strut 90 having first and second terminals 92, 94, and a pivot member 104 (e.g., a bell crank) operatively coupling the linear hydraulic actuator 40 to the flight control member 12.

The support strut 90 may comprise any rigid member known in the art and is manufactured, for example, from a metal or metal alloy such as aluminum. Support strut 90 has a fixed length and functions to translate motion of the flight control member 12 and the biasing member 80 to each other. More particularly, during flight, support strut 90 translates the rotational motion of the flight control member 12 to biasing member 80 responsive to an increase in the biasing load exerted on a flight control surface of the flight control member 12. In this aspect, support strut 90 applies a compression force onto the second mount member 84, which in turn, compresses biasing member 80. Additionally, support strut 90 translates a linear biasing force of biasing member 80 to flight control member 12 responsive to a decrease in the biasing load exerted on the flight control surface of the flight control member 12. That is, biasing member 80 biases the second mount member 84 linearly away from first mount member 82. Support strut 90, in turn, translates this linear biasing force into a rotational force at flight control member 12.

The geometry of the components comprising the actuator assembly 30 beneficially facilitates the ability of the actuator assembly to reduce the number of high-pressure hydraulic cycles needed to control movement of the flight control member 12, reduces the work needed to power flywheel 70 of EMA 60, and also significantly reduces the heat generated by the EMA 60. Particularly, as seen in FIGS. 5A-5D, the first terminal 92 of support strut 90, the first terminal 52 of linear hydraulic actuator 40, and the second terminal 74 of EMA 60 are pivotably connected to each other at a common point and pivot about a common axis $\alpha_1$. The first terminal 72 of EMA 60 is connected to support structure 100 (e.g., a wing spar) via bracket 102. This connection functions to operatively connect both the support strut 90 and the linear hydraulic actuator 40 to the support structure 100.

The second terminal 94 of support strut 90 is pivotably attached to the flight control member 12 about hinge axis $\alpha_2$. The second terminal 54 of the linear hydraulic actuator 40 is also operatively connected to the hinge axis $\alpha_2$ of the flight control member 12 via pivot member 104 such that both components pivot about a common axis $\alpha_3$. More particularly, the second terminal 54 of linear hydraulic actuator 40 is pivotably connected to one end of a pivot member 104, which in turn, is hingedly coupled to the flight control member 12 in a manner such that linear actuation of the linear hydraulic actuator 40 causes pivoting of the flight control member 12 about the hinge axis $\alpha_2$.

In operation, the biasing member 80 is configured to compress and expand responsive to a varying load exerted on a flight control surface of the flight control member 12. In particular, biasing member 80 compresses as the load on the surface of the flight control member 12 increases, and expands as the load on the surface of the flight control member decreases. When biasing member 80 compresses, the motor that drives flywheel 70 of EMA 60 need not work as hard to retract rod 66 into the interior chamber 64, resulting in the use of less electrical power to power EMA 60 and a significant decrease in the heat generated by the EMA 60. The need for hydraulic system 20 to provide hydraulic fluid to linear hydraulic actuator at high pressure also decreases. Thus, biasing member 80 reduces a number of high-pressure hydraulic cycles of the linear hydraulic actuator 40.

The manner in which the actuator assembly 30 controls the movement of a flight control member 12 deviates from conventional systems and methods. In particular, existing systems open actuator valves to provide linear hydraulic actuator 40 with hydraulic fluid while the load on a surface of the flight control member 12 increases. Thus, in conventional systems, the hydraulic pressures in chamber 44 are high and increase with the load exerted on the flight control member 12 as the speed of aircraft 10 increases. As previously described, this "high, pressure-gain operation" can complicate the design of the hydraulic system 20, and particularly the valves within such systems, thereby forcing designers and manufacturers to incorporate new features to handle this region of surface operation. Because the EMA 60 of the present disclosure incorporates biasing member 80, however, the need for such high pressure-gain operations is greatly reduced.

Figure 5A:
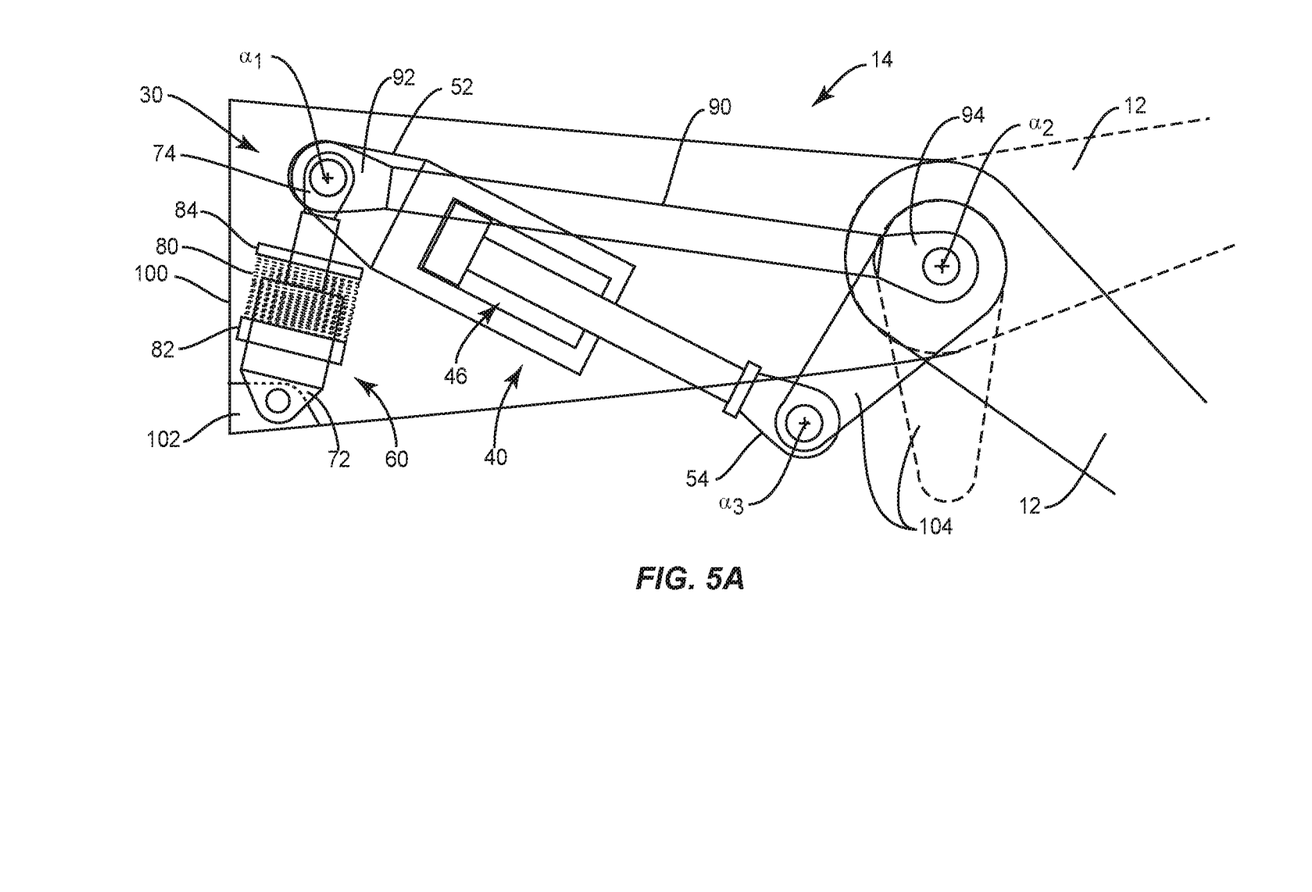
FIGS. 5A-5D are perspective views showing the hydraulic actuator and the EMA disposed in a wing between a support structure and an aileron according to one aspect of the present disclosure.

FIG. 5A illustrates an aspect in which biasing member 80 is compressed and piston 46 of linear hydraulic actuator 40 is retracted into interior chamber 44. In this aspect, because biasing member 80 is compressed, hydraulic system 20 need not provide hydraulic fluid at high pressure to linear hydraulic actuator 40. Further, as previously stated, compression of biasing member 80 reduces the load on the motor that powers the flywheel 70 when retracting rod 66 into interior chamber 64 and helps to significantly decrease the heat generated by the EMA 60.

Figure 5B:
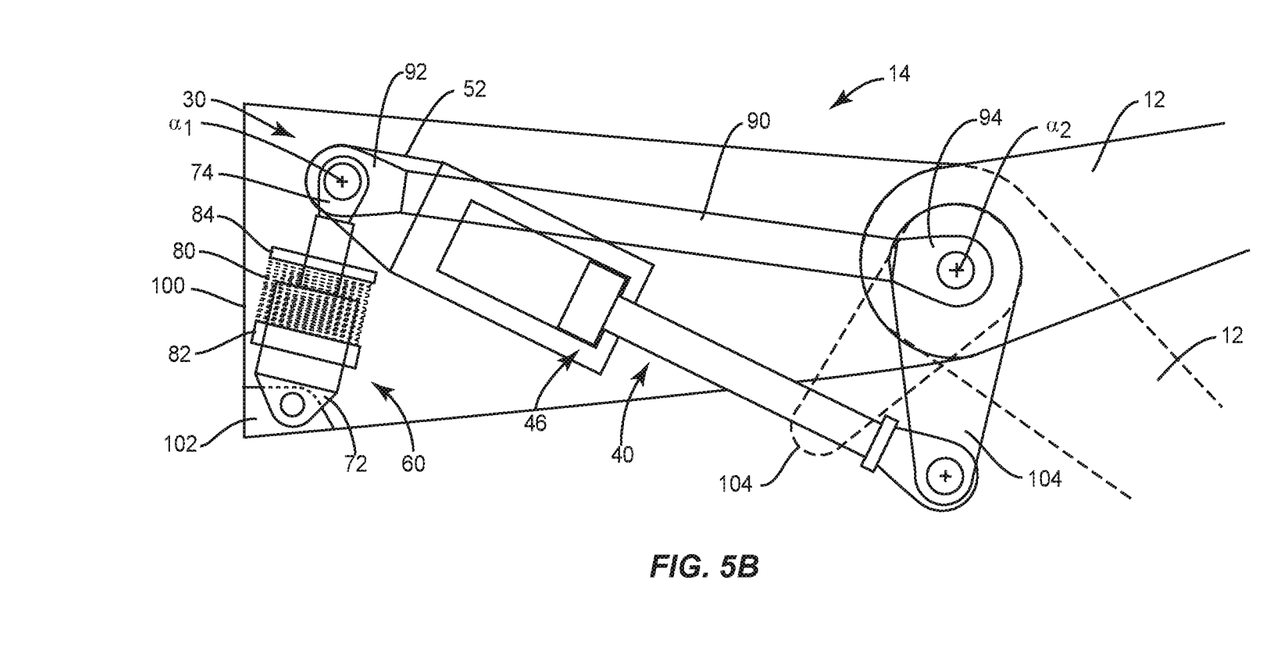

FIG. 5B illustrates an aspect in which biasing member 80 is in a compressed state, and piston 46 is being extended to rotate flight control member 12 counterclockwise. In these aspects, hydraulic system 20 may provide the linear hydraulic actuator 40 with hydraulic fluid at high pressure to pivot flight control member 12 to a desired position. However, once in that position, the number of high pressure cycles needed to maintain the flight control member 12 in that position is reduced because biasing member 80 is being compressed. That is, as the speed of aircraft 10 increases, the biasing member 80 functions to dither any flutter of the flight control member 12 without the need for so many high-pressure cycles. Further, as above, biasing member 80 reduces the load on the motor that powers the flywheel 70 when retracting rod 66 into interior chamber 64 and helps to significantly decrease the heat generated by the EMA 60.

Figure 5C:
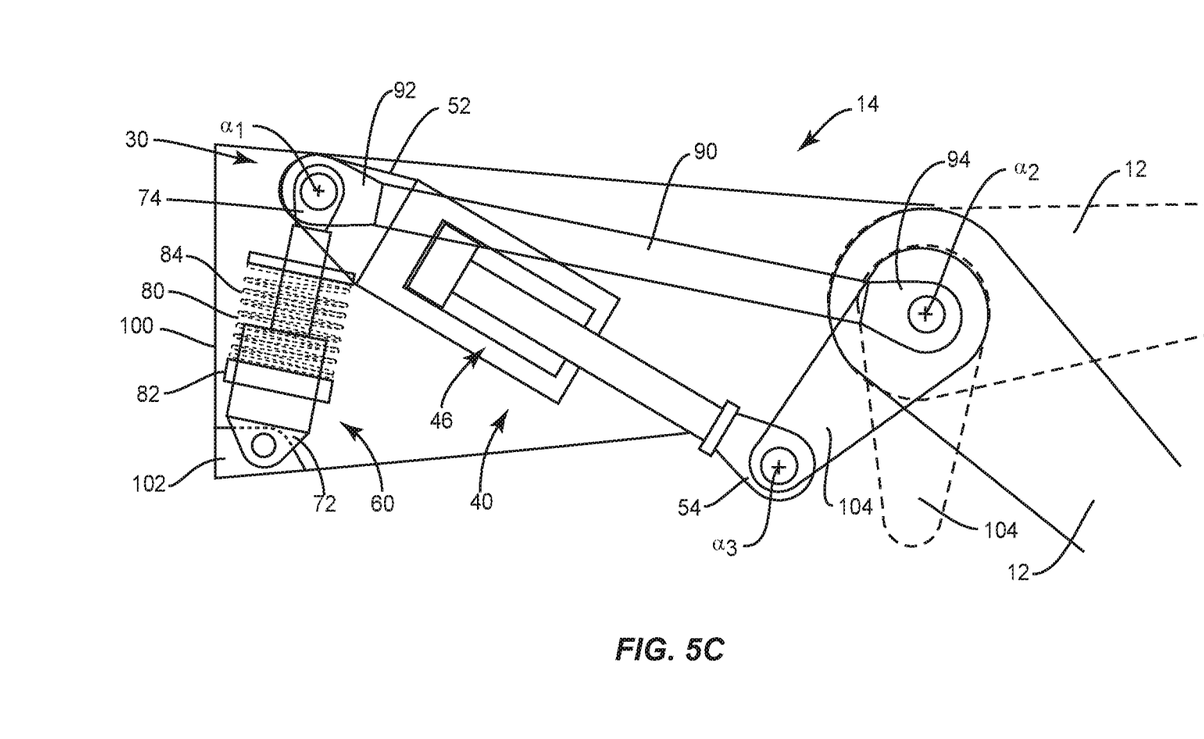
Figure 5D:
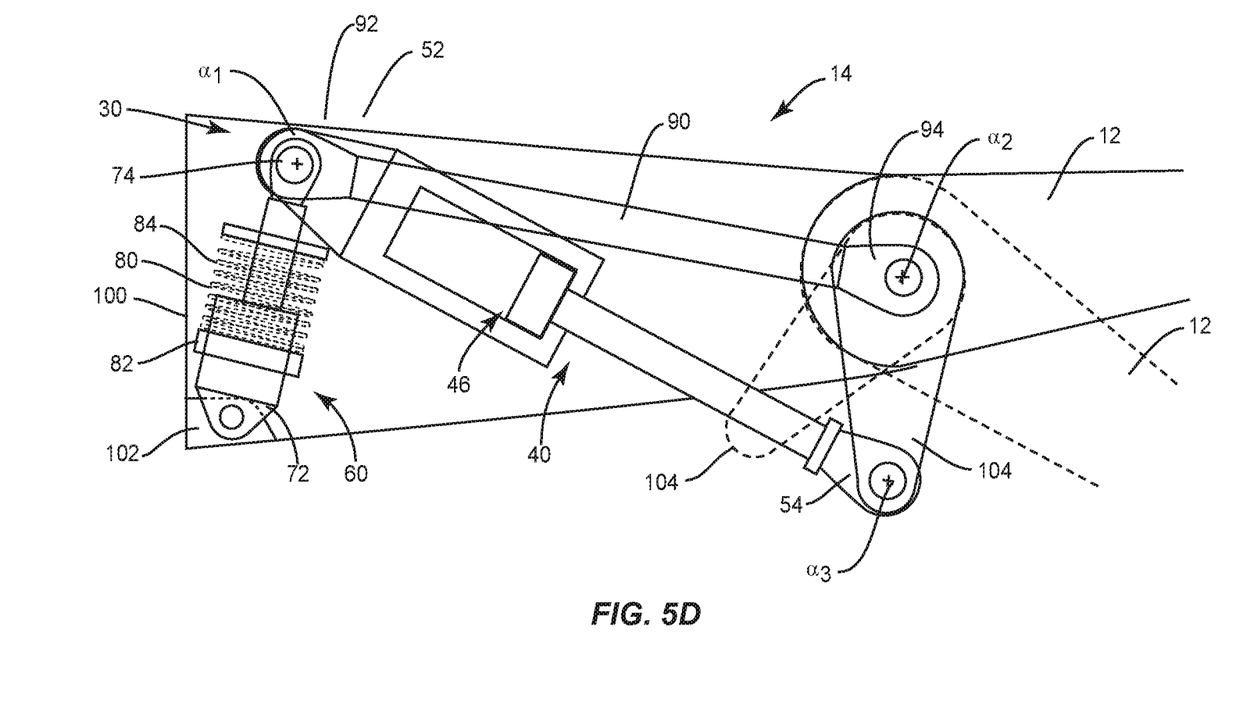

FIG. 5C illustrates an aspect in which biasing member 80 is extended and piston 46 of linear hydraulic actuator 40 is retracted. FIG. 5D illustrates an aspect in which both the biasing member 80 and the piston 46 of linear hydraulic actuator 40 are extended. Under conditions similar to those of FIGS. 5C-5D, hydraulic system 20 will provide hydraulic fluid at high pressure to linear hydraulic actuator 40. However, as the load exerted on the flight control member 12 increases, biasing member 80 will once again begin to compress. Thus, the need for hydraulic pressure to be delivered to the linear hydraulic actuator 40 at such high pressures will be reduced, as previously stated.

Figure 6:
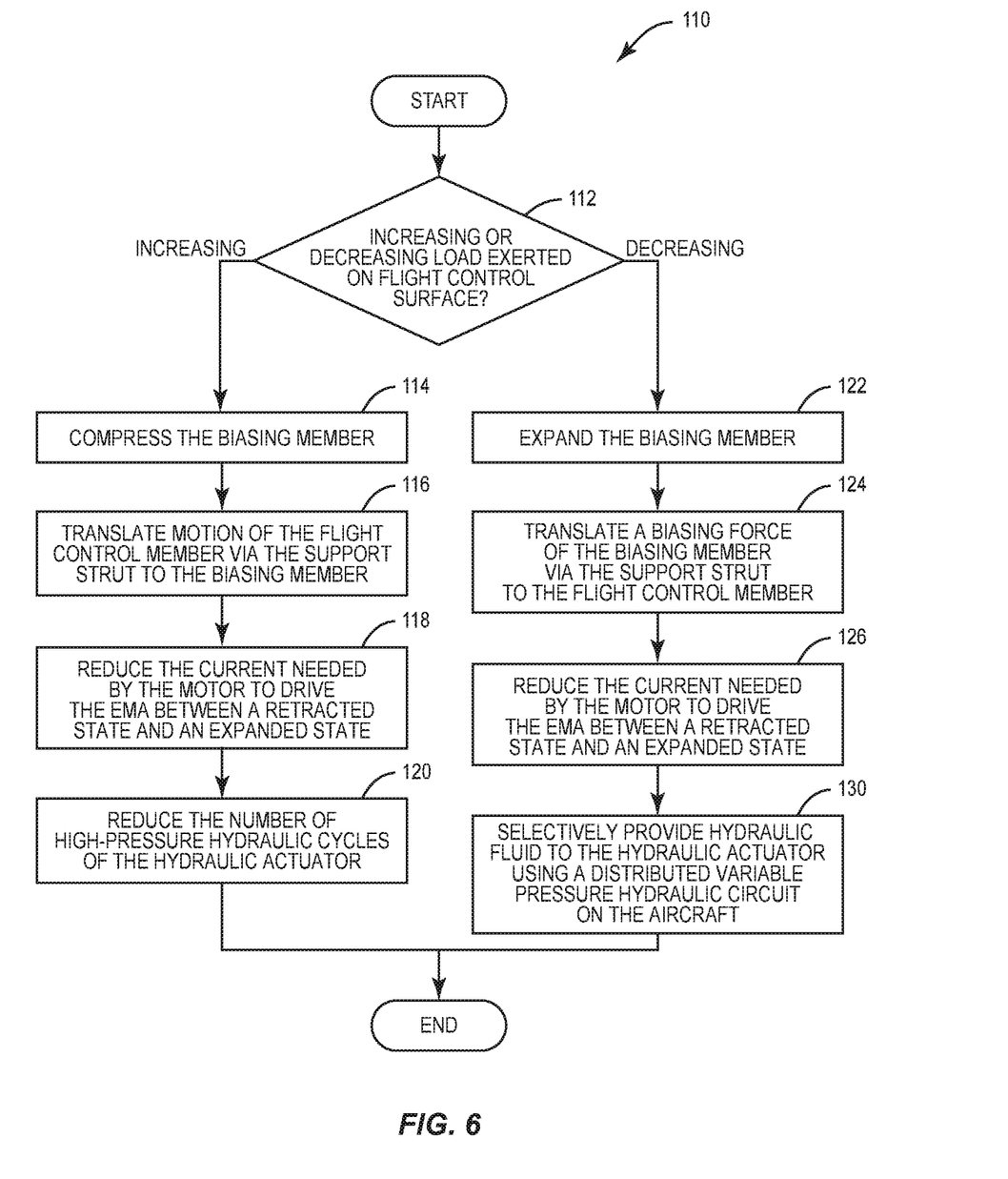
FIG. 6 is a flow diagram illustrating a method of operating the EMA to reduce the number of high-pressure hydraulic cycles of the linear hydraulic actuator.

FIG. 6 is a flow diagram illustrating a method 110 for controlling movement of flight control member 12 according to one aspect of the disclosure. As seen in FIG. 6, method 110 begins with a determination of whether a load being exerted on a surface of a flight control member 12 is increasing or decreasing (box 112). Generally, one or more pressure sensors (not shown) may be used to determine a change in pressure; however, other methods are also available.

If the load exerted on the surface of flight control member 12 is increasing, biasing member 80 compresses (box 114), and the motion of the flight control member 12 is translated to the biasing member 80 via support strut 90 (box 116). Additionally, due to the compressing biasing member 80, the amount of current needed to drive flywheel 70 of EMA 60 is reduced (box 118), as is the number of high-pressure hydraulic cycles needed by the linear hydraulic actuator 40 (box 120).

If the load exerted on the surface of flight control member 12 is decreasing, however (box 112), biasing member 80 will expand (box 122). This biasing force is translated to the flight control member 12 via support strut 90 (box 124), and helps reduce the load placed on the motor-driven flywheel 70 when expanding rod 66 out of the interior chamber 64 (box 126). Hydraulic fluid can then be selectively provided to linear hydraulic actuator 40 using the distributed variable-pressure hydraulic system 20 (box 128).

In the aspect above, motion of the EMA 60 is responsive to the variable load exerted on the surface of flight control member 12. In another aspect, however, EMA 60 motion is scheduled. By way of example, consider an unmanned vehicle where the ultimate velocity, the time-to-high bias load, and the beginning of the time intervals over which the load exerted on the surfaces of the flight control members, are known. In these aspects, EMA 60 motion can be implemented as selectable options during the planning of a flight schedule, thereby taking advantage of route planning. To improve the efficiency of the hydraulic system 20, the EMA 60 could transition to the previously described bias load based motion responsive to sensing the motor current. In such cases, the sensed current could represent the final state of the EMA 60 position that is required to balance the biasing load exerted on the surface of the flight control member 12 in the event that a planned part of the flight schedule is not yet realized.

By moving the EMA 60 into its final position all-at-once, the efficiency of the distributed variable-pressure hydraulic system 20 is improved. Particularly, most, if not all, hydraulic systems experience leakage. Such leakage wastes power and is a function of pressure between high side and low side pressures. However, in moving EMA 60 into its final position all-at-once, hydraulic system 20 provides the hydraulic fluid ultimately required to bias the EMA 60 at a higher average flow at higher pressure. More particularly, the distributed variable-pressure hydraulic system 20 will raise its high side pressure to fill the interior chamber 44 with hydraulic fluid at the maximum rate possible. As previously described, this biases the biasing member 80 of EMA 60 to its new position before the aerodynamic loads are exerted on the surface of flight control member 12. However, it also ultimately reduces leakage of the average flow of hydraulic fluid, thereby achieving greater efficiency of the hydraulic system 20. Further, the surface position of the flight control member 12 does not change in the transition. Particularly, the linear hydraulic actuator 40 moves to counter the motion of EMA 60 into a position that eventually reduces the amount of motor current required to accommodate movement of the flight control member 12 at high aircraft speed to reduce high pressure cycles on the distributed variable-pressure hydraulic system 20, thereby significantly reducing the heat generated by the EMA 60.

The previously described aspects are mechanical. However, those of ordinary skill in the art will readily appreciate that the present aspects are not so limited. In one aspect, for example, at least some of the functionality previously described with respect to actuator 40 and/or EMA 60 can be implemented by a control unit executing one or more software functions. This will allow the present aspects to address dynamically changing situations at a lower cost.

Particularly, software functions, once they are satisfactorily operating, can be reproduced without variance. Such variances inherently exist, for example, when manufacturing and processing the physical, chemical, mechanical, and electrical components designed to perform the functions described previously. Thus, the software functions executing at the control unit are more reliable. Further, the use of one or more software functions executing at a control unit permits the present disclosure to address future system capabilities without having to provide a new set of physical components such as EMA 60. Moreover, implementation of the present aspects as one or more executable software functions provides uniformity of functionality and reliability across systems utilized by an entire fleet of aircraft 10.

Figure 7:
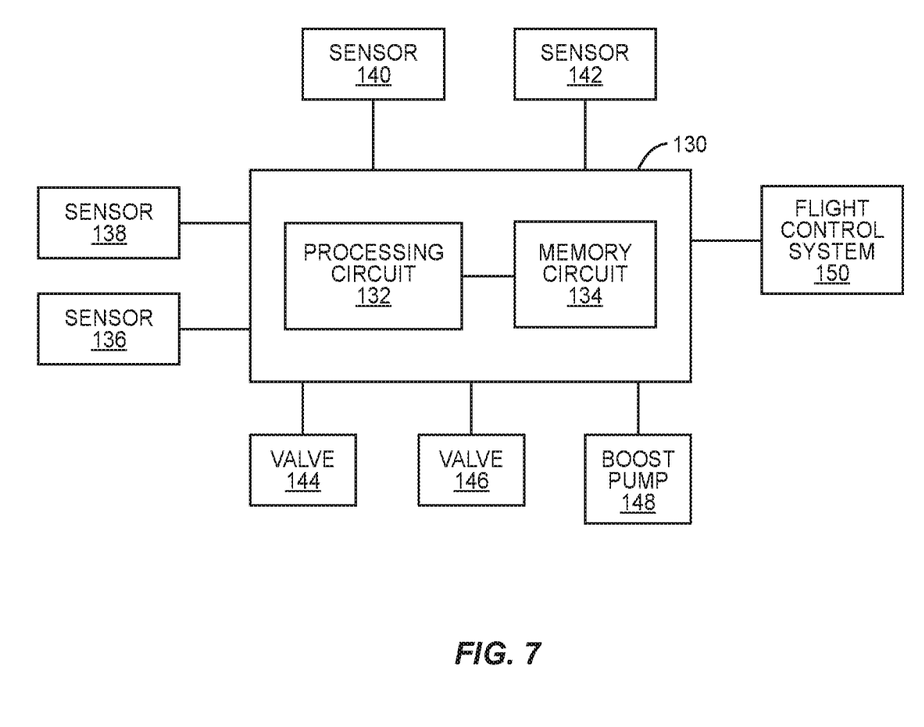
FIG. 7 is a schematic diagram of a control unit.

FIG. 7 is a functional block diagram of a control unit 130 configured to control the movement of hydraulic fluid through hydraulic system 20, and to monitor the operation of EMA 60 by monitoring a current at a coil of a motor that drives the flywheel 70 of EMA 60.

As seen in FIG. 7, actuation control unit 130 comprises one or more processing circuits 132 that may include one or more microprocessors, Application Specific Integrated Circuits (ASICs), or the like, configured with appropriate software and/or firmware. A computer readable storage medium, seen in FIG. 7 as memory circuit 134, stores data and computer readable program code that configures the processing circuit 132 to implement the techniques described above. Memory circuit 134 is a non-transitory computer readable medium, and may include various memory devices such as random access memory, read-only memory, and flash memory.

The actuation control unit 130 can receive signals from one or more sensors 136, 138, 140, 142 positioned along the hydraulic system 20 and/or the motor that drives flywheel 70. In the latter case, one or more of the sensors 136, 138, 140, 142 may be disposed to sense a current at a winding of the motor. The actuation control unit 130 can communicate with a flight control system 150 that controls one or more functions of the aircraft 10. For example, in one or more aspects, the flight control system 150 provides various data to actuation control unit 130, such as but not limited to the commanded movements of the flight control member 12.

The actuation control unit 130 controls the movement of the hydraulic fluid through hydraulic system 20 to position the flight control member 12 in its commanded position. The actuation control unit 130 uses inputs from the one or more sensors 136, 138, 140, 142 to control the valves 144, 146 and the boost pump 148 to supply the needed hydraulic fluid to the linear hydraulic actuators 40, as well as to decrease a current provided to the motor that drives the rotation of flywheel 70 when the biasing member 80 is in a compressed state.

Aspects of the present disclosure further include various methods and processes, as described herein, implemented using various hardware configurations configured in ways that vary in certain details from the broad descriptions given above. For example, as previously stated, the actuator assembly 30 of the present disclosure provides benefits that conventional actuator systems do not provide, or are not capable of providing. For example, the actuator assembly 30 of the present aspects creates or contributes to a system that beneficially allows for significant savings in the power consumption of aircraft 10 by reducing the number of high pressure cycles of the hydraulic actuator 40. Such reductions allow the distributed hydraulic system 20 to avoid operating at high pressure at least part of the time to increase the reliability of the distributed hydraulic system 20 and assure the variable pressure functionality provided by the distributed hydraulic system 20, thereby leaving a low pressure pump driven by the aircraft engines to drive a larger percentage of hydraulic fluid flow. Additionally, because the actuator assembly 30 of the present disclosure controls flutter, fewer hydraulic actuators 40 are needed on aircraft 10 thereby requiring less power to be generated by the engines of aircraft 10.

Additionally, the present disclosure describes the foregoing aspects in the context of an aircraft 10. However, those of ordinary skill in the art will readily appreciate that this is for illustrative purposes only, and that the aspects described herein are not limited solely to use in aircraft. Rather, the previously described aspects can be implemented on other types of vehicles to achieve the same or similar benefits. Such vehicles include, but are not limited to, manned and unmanned automobiles, manned and unmanned aircraft, manned and unmanned spacecraft, manned and unmanned rotorcraft, manned and unmanned spacecraft such as satellites, rockets, and missiles, manned and unmanned surface water borne craft, manned and unmanned sub-surface water borne craft, and the like, as well as combinations thereof.

The foregoing description and the accompanying drawings represent non-limiting examples of the methods and apparatus taught herein. As such, the aspects of the present disclosure are not limited by the foregoing description and accompanying drawings. Instead, the aspects of the present disclosure are limited only by the following claims and their legal equivalents.

What is claimed is:

1. An actuator assembly configured to control movement of a flight control member of an aircraft, the actuator assembly comprising:
    a support strut operatively coupled to a hinge axis of a flight control member of an aircraft;
    a hydraulic actuator coupled to the flight control member via a pivot element, and configured to pivot the flight control member about the hinge axis; and
    an electro-mechanical actuator (EMA) comprising:
        a first end operatively coupled to a support structure of the aircraft;
        a second end, opposite the first end, operatively coupled to both the support strut and the hydraulic actuator; and
        a biasing member configured to move between a compressed state and an expanded state responsive to a varying biasing load exerted on a surface of the flight control member.

2. The actuator assembly of claim 1 wherein the biasing member is configured to:
    move to the compressed state responsive to an increase in the biasing load exerted on the surface of the flight control member; and
    move to the expanded state responsive to a decrease in the biasing load exerted on the surface of the flight control member.

3. The actuator assembly of claim 2 wherein the support strut comprises a rigid, fixed length support member configured to:
    translate motion of the flight control member to the biasing member responsive to the increase in the biasing load exerted on the flight surface; and
    translate bias of the biasing member to the flight control member responsive to the decrease in the biasing load exerted on the flight surface.

4. The actuator assembly of claim 1 wherein the EMA further comprises first and second spaced-apart mount members, and wherein the biasing member is disposed between the first and second mount members and biases the first and second mount members away from each other.

5. The actuator assembly of claim 4 wherein the first mount member moves relative to the second mount member responsive to a biasing force exerted on the first mount member by the biasing member, and a compression force exerted on the first mount member by the support strut.

6. The actuator assembly of claim 1 wherein the hydraulic actuator comprises one or more ports configured to receive hydraulic fluid from a variable hydraulic system on the aircraft, and when in the compressed state, the biasing member is configured to reduce a number of high-pressure hydraulic cycles of the hydraulic actuator.

7. The actuator assembly of claim 1 wherein the biasing member is configured to reduce a current on an EMA motor that drives the EMA to move between a retracted state and an extended state.

8. The actuator assembly of claim 1 wherein the support strut, the hydraulic actuator, and the second end of the EMA pivot about a common axis when the biasing member moves between the compressed state and the expanded state.

9. An aircraft comprising:
    a support structure;
    a flight control member; and
    an actuator assembly disposed between the support structure and the flight control member, the actuator assembly comprising:
        a support strut operatively coupled to a hinge axis of the flight control member;
        a hydraulic actuator coupled to the flight control member via a pivot element, and configured to pivot the flight control member about the hinge axis; and
        an electro-mechanical actuator (EMA) comprising:
            a first end operatively coupled to the support structure;
            a second end, opposite the first end, operatively coupled to both the support strut and the hydraulic actuator; and
            a biasing member configured to move between a compressed state and an expanded state responsive to a varying biasing load exerted on a surface of the flight control member.

10. The aircraft of claim 9 further comprising a distributed variable-pressure hydraulic system configured to selectively provide hydraulic fluid to the hydraulic actuator, and wherein the biasing member moves to the compressed state during a cycle in which the variable-pressure hydraulic system is not providing the hydraulic fluid to the hydraulic actuator.

11. The aircraft of claim 9 further comprising a control circuit configured to reduce a current to a motor that drives the EMA to move between a retracted state and an extended state.

12. The aircraft of claim 9 wherein the biasing member is configured to move to the compressed state when the biasing load exerted on the surface of the flight control member increases, and move to the expanded state when the biasing load exerted on the surface of the flight control member decreases.

13. The aircraft of claim 9 wherein the support strut comprises a rigid, fixed length support member configured to:
    translate motion of the flight control member to the biasing member responsive to an increase in the biasing load exerted on the flight surface; and
    translate a biasing force of the biasing member to the flight control member responsive to a decrease in the biasing load exerted on the flight surface.

14. The aircraft of claim 9 wherein the EMA further comprises first and second spaced-apart mount members, and wherein the biasing member is disposed between the first and second mount members and is configured to bias the first and second mount members away from each other.

15. A method of controlling a flight control member of an aircraft comprising a rigid support strut operatively coupled to a hinge axis of the flight control member, a hydraulic actuator operatively coupled to the flight control member via a pivot element, and an electro-mechanical actuator (EMA) comprising a biasing member and first and second terminals, wherein the first and second terminals are operatively coupled, respectively, to a support structure of the aircraft, and to both the support strut and the hydraulic actuator, the method comprising:
 compressing the biasing member responsive to an increase in a biasing load exerted on a flight surface of the flight control member; and
 expanding the biasing member responsive to a decrease in the biasing load exerted on the flight surface of the flight control member.

16. The method of claim 15 wherein compressing the biasing member comprises translating motion of the flight control member via the support strut to the biasing member responsive to the increase in the biasing load exerted on the flight surface.

17. The method of claim 16 wherein expanding the biasing member comprises translating a biasing force of the biasing member via the support strut to the flight control member responsive to the decrease in the biasing load exerted on the flight surface.

18. The method of claim 15 further comprising reducing a current needed by a motor that drives the EMA between a retracted state and an expanded state responsive to at least one of the biasing member compressing and expanding.

19. The method of claim 15 further comprising selectively providing hydraulic fluid to the hydraulic actuator using a distributed variable-pressure hydraulic system on the aircraft, and wherein compressing the biasing member comprises compressing the biasing member when the hydraulic system is not providing the hydraulic fluid.

20. The method of claim 15 further comprising reducing a number of high-pressure hydraulic cycles of the hydraulic actuator responsive to the biasing member compressing.

* * * * *